United States Patent [19]

Marchal

[11] 4,260,335
[45] Apr. 7, 1981

[54] PROCESS FOR THE COMPRESSION OF STEAM AND THERMAL CIRCUITS FOR ITS IMPLEMENTATION

[75] Inventor: Paul H. Marchal, Garches, France

[73] Assignee: Air Industrie, Courbevoie, France

[21] Appl. No.: 860,045

[22] Filed: Dec. 13, 1977

[30] Foreign Application Priority Data

Dec. 15, 1976 [FR] France .................. 76 37754

[51] Int. Cl.$^3$ .......................................... F04C 19/00
[52] U.S. Cl. ........................... 417/68; 417/69; 34/15; 237/67
[58] Field of Search ............... 60/642, 648, 653, 670, 60/667; 237/67; 417/68, 69; 34/86, 15, 35, 119, 124, 155, 36, 37, 26, 32

[56] References Cited

U.S. PATENT DOCUMENTS

| | | | |
|---|---|---|---|
| 2,116,939 | 5/1938 | Zahm et al. | 417/68 |
| 2,492,754 | 12/1949 | Martin, Jr. | 34/86 |
| 2,599,149 | 6/1952 | Allen | 417/68 |
| 2,811,787 | 11/1957 | Clements | 34/119 |
| 3,032,258 | 5/1962 | Jennings | 417/68 |
| 3,228,587 | 1/1966 | Segebrecht | 417/68 |
| 3,251,138 | 5/1966 | Whittaker | 34/119 |
| 3,481,529 | 12/1969 | Mugele | 417/68 |
| 4,026,035 | 5/1977 | Dyer et al. | 34/119 |
| 4,087,208 | 5/1978 | Uda et al. | 417/68 |

FOREIGN PATENT DOCUMENTS 2341830 9/1977 France .

Primary Examiner—Larry I. Schwartz

[57] ABSTRACT

A process for the compression of steam, particularly very low pressure saturated steam; and thermal circuits for its implementation.

For the compression of the steam there is used at least one liquid ring compressor using water as compression agent.

Principal applications: drying enclosures and circuits for obtaining compressed saturated steam.

10 Claims, 4 Drawing Figures

PROCESS FOR THE COMPRESSION OF STEAM AND THERMAL CIRCUITS FOR ITS IMPLEMENTATION

The present invention relates to a process for the compression of steam and thermal circuits for its implementation.

It is known that the adiabatic compression of saturated steam in compressors currently used for steam, e.g. rotary or piston dry volumetric compressors, has the disadvantage that the compressed steam which is obtained is very much superheated. As a result of the difficulties in lubrication at such high temperatures, the machine can seize up. This entails the necessity of de-superheating the steam, which is also required for using it in conventional condensers, and from which there results complication of the technology of the compressor and an increase in its cost.

The aim of the invention is generally to get over this disadvantage and to define a process and circuits for the compression of pure steam without superheating it, and with the recovery, in the form of compressed saturated pure steam, of the mechanical energy for the compression.

A more particular aim of the invention is to obtain steam compression at very low pressure and even in a vacuum, to obtain saturated steam at a higher pressure.

In practice, it can be useful for obtaining saturated steam at high pressure, to create a heat supply in a drying enclosure, from very low pressure saturated steam (under partial vacuum), coming from an evaporator, the heat for vaporisation being supplied by a condenser fed with the steam and/or humid air extracted from the enclosure and coming from the dried product. Such a thermal circuit associated with a drying enclosure and using the heat pump principle is described in French patent application No. 2,341,830, in the name of the applicant.

These different aims can be reached, in accordance with the invention, in that, for the compression of the steam, particularly at very low pressure, at least one liquid ring compressor is used, using water as the compression agent.

The detailed description of such a compressor does not need to be given here. It is sufficient to recall that inside a stator of suitable shape, rotates a rotor fitted with vanes which set in motion the liquid contained in the stator and project it against the wall, in the form of a kind of ring. The gas to be compressed is admitted through ports and confined in the spaces defined by two successive vanes, the centre of the rotor and the inner surface of the liquid ring. This gas is compressed by reduction of the volume of these spaces and discharged through discharge ports.

It has been found experimentally that the use of such a machine, going moreover against the prejudices of the man skilled in this field of the art, was perfectly adapted for solving the problem posed, as this will be demonstrated hereafter. It can be noted straightaway that there will be intimate thermal exchange between the steam and the water of the liquid ring and that the steam will be saturated or will remain constantly saturated during the whole of the compression cycle, and for this reason will have a much lower temperature at the output, than that which it would have at the output of a dry compressor.

A process in accordance with the invention can again be characterized in that, before feeding it to a user circuit, the saturated and compressed steam taken from the discharge side of a liquid ring compressor is introduced into a high pressure water-steam separating balloon flask and in that the water recovered at the lower part of the balloon flask is recycled towards the liquid ring of the compressor; the lower part of the separating balloon flask also communicates with an inlet for new water and the flow of new water is controlled in accordance with the level of the water in the balloon flask.

The new water supply to the liquid ring will compensate for the amount of water of the liquid ring which is vaporized and the small amount of water which is possibly carried along with the steam.

When it is desired to obtain a fairly high determined value of the pressure of the saturated steam at the output, at least two liquid ring compressors can be used connected in series, the suction side of one being connected to the discharge side of the preceding one through the upper part of a high pressure water-steam separating balloon flask.

A process in accordance with the invention can again be characterised in that the water recovered at the lower part of the separating balloon flask of a compressor is recycled, on the one hand, towards the liquid ring of the compressor considered and, on the other hand, towards the liquid ring of the preceding compressor, through the separating balloon flask associated with the preceding compressor, when it is desired to form a closed compression circuit with recycling of the condensate of the compressed steam after use of its latent heat, following the heat pump principle.

A process in accordance with the invention, in its latter embodiment, will in any case be particularly well adapted for use in a heat pump thermal circuit associated with a drying enclosure.

It can then be characterized, in accordance with the invention, in that it is applied to the compression of the steam coming from an evaporator associated with a condenser receiving steam and/or humid air extracted from a drying enclosure, and in that the saturated steam, compressed without superheating coming from the discharge side of the last liquid ring compressor, is fed into the drying enclosure to create a heat supply in this latter, by convection or by conduction.

The invention concerns moreover thermal circuits for the implementation of the process, circuits which will be defined more specifically below by way of examples which are in no wise limiting.

Figure 3:
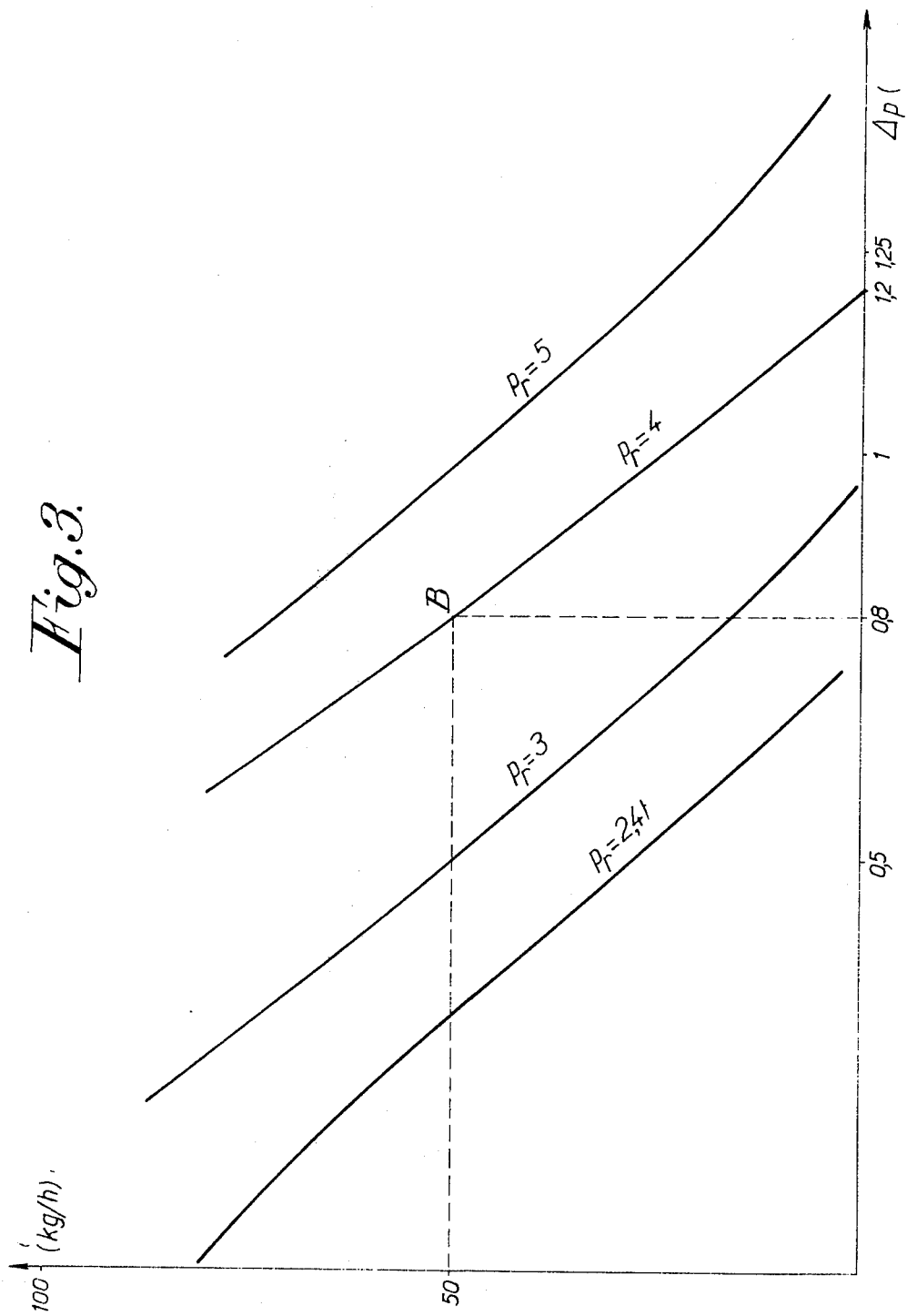
Figure 4:
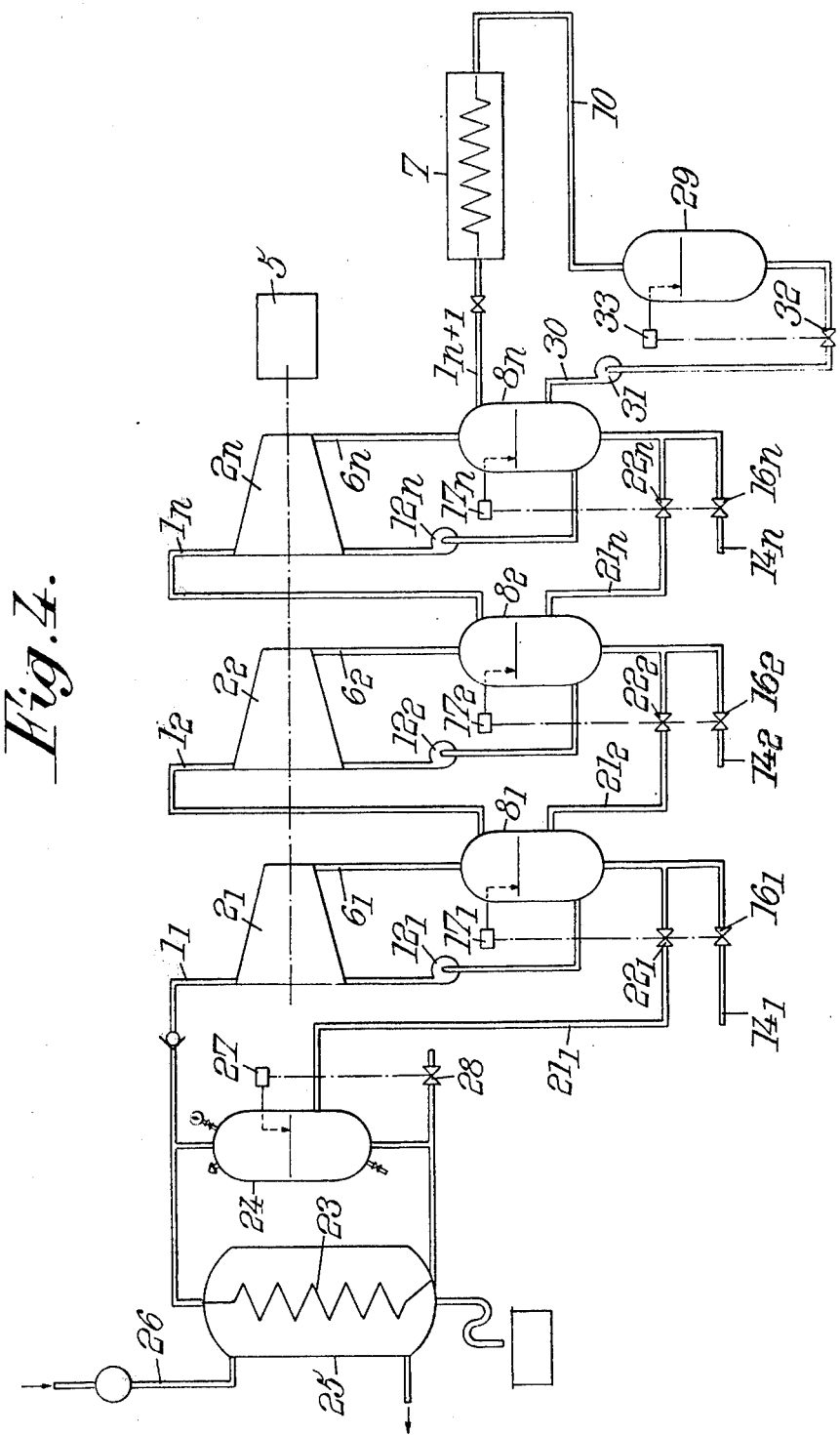

FIG. 3 is a graph giving the suction flow of steam in terms of the increase $\Delta p$ of the pressure, for different values of the pressure at the discharge side of a small commercial liquid ring compressor; and FIG. 4 shows a thermal circuit according to the invention comprising several liquid ring compressors connected in series, and associated with a drying enclosure, following the heat pump principle.

Figure 1:
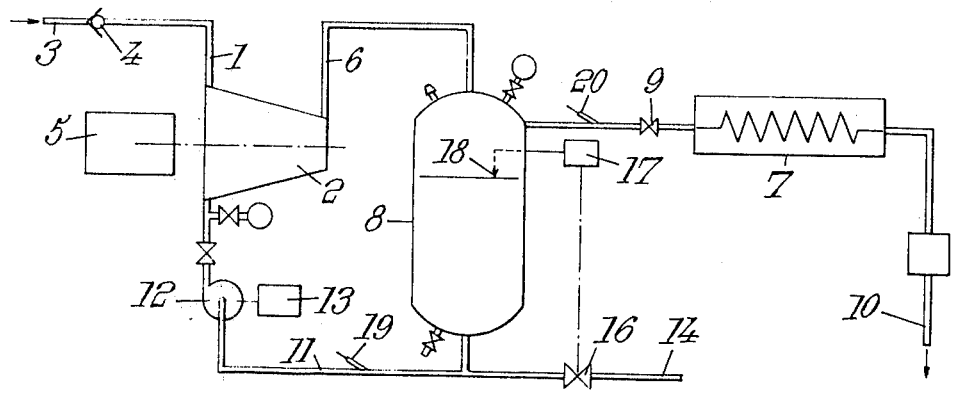
FIG. 1 shows a basic thermal circuit in accordance with the invention comprising a single liquid ring compressor, in an open steam circuit.

Referring to FIG. 1, the suction side 1 of a water liquid ring compressor 2 is connected to a low pressure steam inlet pipe 3, through a non-return valve 4. The rotor of the compressor is driven by a motor 5. The discharge side 6 of compressor 2 supplies saturated and compressed steam to a user circuit 7, e.g. a condenser, through the upper part of a high pressure separating balloon flask 8 and a valve 9. The condensates are discharged at 10. The water from the lower part of the balloon flask 8 is recycled towards the liquid ring of compressor 2 by a pipe 11 and pump 12 driven by a motor 13. The temperature of the water supplying the liquid ring is then equal to that of the saturated and compressed steam supplied at 6 by compressor 2.

The mechanical energy supplied by motor 5 and circulating pump 12 is transmitted in its entirety to the water of the liquid ring, apart from radiation or convection losses. The part of the liquid ring which is vaporised is replaced by the new water fed to the circuit by a pipe 14 connected to pipe 11 and provided with a valve 16. Valve 16 is governed by a regulator 17 receiving the signal from a water level sensor 18.

The circuit may also comprise temperature sensors, such as 19 and 20, manometers, flowmeters, drain, adjusting, insulating valves etc. and any conventional safety devices.

Figure 2:
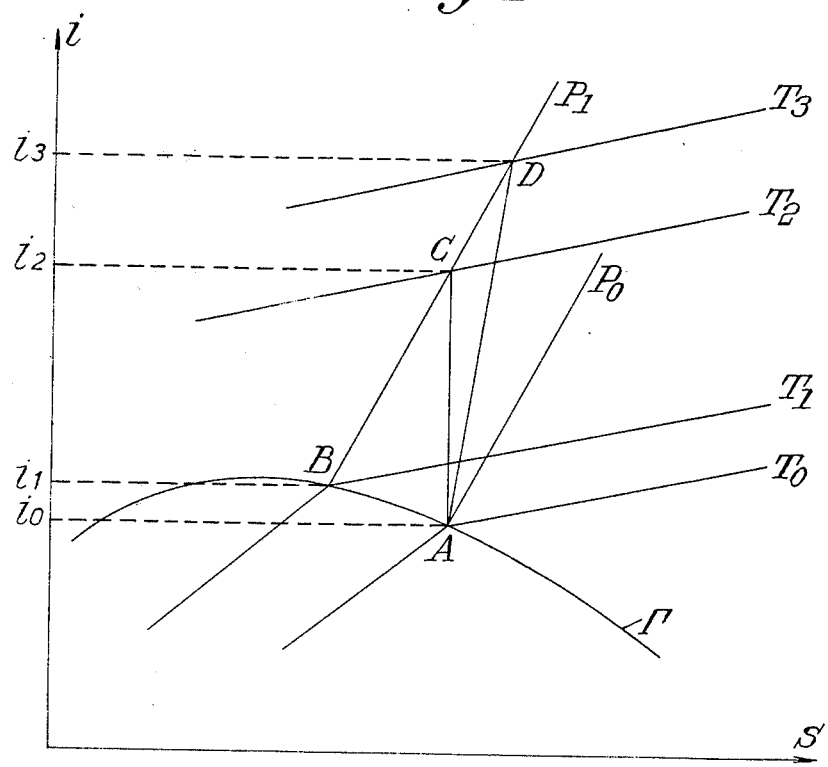
FIG. 2 shows the Mollier diagram for the water.

FIG. 2 shows the enthalpy-entropy Mollier diagram for the steam. Point A represents the state of input saturated steam at pressure $P_o$ and temperature $T_o$, such as supplied by pipe 3. If, to compress this steam at pressure $P_1$, a perfect compressor were used, with isentropic efficiency $\zeta_s = 1$, the point representative of the condition of the steam would arrive at C, following the isentropic straight segment AC, and correspond to a temperature $T_2$ much greater than $T_o$. With a piston or rotary dry conventional compressor not perfectly isentropic ($\zeta_s < 1$), the condition of the superheated steam compressed at pressure $P_1$ would be represented by point D, where temperature $T_3$ is again greater than $T_2$. In practice, there could thus be a considerable difference between the temperatures $T_3$ of the steam at the discharge side of the compressor and $T_0$ at the suction side, which would necessitate de-superheating the steam, not only during compression but also afterwards, to avoid disadvantages of a technological kind in the compressor or in the use by exchangers.

On the contrary, with the use of a water liquid ring compressor, the point representative of the compressed saturated steam would follow the saturation curve $\Gamma$ to reach, at the same pressure $P_1$, point B where temperature $T_1$ is only a little higher than the initial temperature $T_0$. We can then see the advantage in using, in accordance with the invention, a water liquid ring compressor.

It has been found experimentally:

(1) That the temperature of the steam measured at the discharge side of the compressor is indeed the saturated steam temperature at the measured discharge pressure;

(2) That there exists a maximum constant value of the difference $\Delta T = T_1 - T_0$ for a water liquid ring compressor rotating at constant speed, for zero suction flow, whatever the suction pressure. Maximum $\Delta T$ depends only on the speed and the size of the compressor; the higher these parameters the greater $\Delta T$.

This last result can be deduced by analysis of the curves of FIG. 3 which show test results obtained with a small commercial liquid ring compressor, for different constant pressure values $P_r$ at the discharge side: 2.4 bars, 3 bars, 4 bars, 5 bars etc. The characteristics under partial vacuum have not been given for the sake of clarity, but they would also show the second assertion made above.

For $P_r = P_1 = 4$ bars, for example, we can have an operating point at B, at which $\Delta P = P_1 - P_0 = 0.8$ bars, with a flow of steam at the input of 50 kg/h, and a suction pressure $P_0 = P_1 - \Delta p = 3.2$ bars.

These saturated steam pressures correspond to input, $T_0 =$ about 136° C., and output, $T_1 =$ about 145° C., temperatures. The temperature increase $\Delta T$ is then very small: about 9° C., whereas with an excellent conventional dry compressor it could reach 27° C.

In the case where a single liquid ring compressor is not sufficient to obtain a definite pressure, several water liquid ring compressors can be used connected in series as indicated hereabove. An example of a thermal circuit of this kind is shown diagrammatically in FIG. 4, for the case where it forms a heat pump applied to a dryer.

This circuit comprises a number of liquid ring compressors $2_1, 2_2 \ldots 2_n$. The discharge side $6_1, 6_2 \ldots 6_n$ of each compressor is connected respectively to the input $1_2 \ldots 1_n, 1_{n+1}$ of the following circuit through a high pressure separating balloon flask, respectively $8_1, 8_2 \ldots 8_n$ whose lower part communicates with the liquid ring of the compressor considered through recycling pipes and pumps, respectively $12_1, 12_2 \ldots 12_n$. The lower part of each balloon flask communicates in addition with a pipe for supplying new water, respectively $14_1, 14_2 \ldots 14_n$ each provided with a valve, respectively $16_1, 16_2 \ldots 16_n$. The lower parts of two successive balloon flasks are moreover connected by return pipes, respectively $21_1, 21_2 \ldots 21_n$, each provided with a valve, respectively $22_1, 22_2 \ldots 22_n$. These valves, as well as valves $16_1$ to $16_n$, are controlled by level regulators, respectively $17_1, 17_2 \ldots 17_n$, similarly to the case of FIG. 1, so as to permit either the draining of the corresponding balloon flask by acting on the valve $22_1, 22_2 \ldots$ or its filling by acting on the new water input valve $16_1, 16_2 \ldots$ A common motor 5 may be provided for driving all the compressors, a constant or variable speed electric motor or similar, or else a motor for each compressor.

For the first comparison stage, the very low pressure standard pure steam is supplied by an evaporator 23 fed with water by a low pressure separating balloon flask 24 whose upper part communicates with the outlet of evaporator 23 and with inlet $1_1$ of compressor $2_1$. The heat is supplied by a condenser 25 receiving, through a pipe 26, the steam and/or the humid air extracted from a drying enclosure (not shown) which may be similar to the drying enclosure described in French patent application No. 76 04597.

The level of water in the balloon flask 24 is kept constant by a level regulator 27 acting on a new water inlet valve 28.

The high pressure saturated steam produced by the last compressor $2_n$ is directed, through pipe $1_{n+1}$, towards a heat exchanger-condenser 7 of the drying enclosure, producing the heat supply in this latter.

The condensates, occurring at 10, of the exchanger of the dryer, are recycled in a high pressure separating balloon flask 29 whose lower part is connected to the lower part of the separating balloon flask $8_n$ of the last compression stage by a pipe 30 provided with a circulating pump 31 and a valve 32. The level of the balloon flask 29 is regulated by a level regulator 33 acting on valve 32. These condensates from the exchanger of the dryer are then recycled to the separating balloon flask 24, passing successively through the separating balloons $8_n \ldots 8_2, 8_1$ of the compression stages.

In such a closed thermal circuit, the new water inlet valves only serve at start-up for filling the different balloon flasks 24 and $8_1$ to $8_n$.

A heating system for start-up can consist simply of a direct steam supply to the low pressure balloon flask 24.

So as not to complicate the diagram, the associated adjusting, controlling and regulating devices of the circuit such as flowmeters, thermometers, non-return valves, adjusting and isolating valves etc. have not been shown.

It goes without saying, finally, that such a circuit will provide the same basic advantages as those of the simple circuit of FIG. 1, i.e. essentially to allow compression of saturated steam taken at very low pressure, without superheating of the compressed steam.

Such a circuit as that shown in FIG. 4 will be very advantageously used with an installation for the continuous heat treatment of a product moving through an enclosure, such as the one described in French patent application No. 76 04597 in the name of the applicant; this circuit will contribute to making even greater the advantage of this installation from the economical point of view, because of the absence of superheating of the steam produced.

As is evident, and as follows moreover from what has gone before, the invention is in no wise limited to those of its embodiments and modes of application which have been more especially considered; it embraces, on the contrary, all variations thereof.

We claim:

1. A thermal circuit for supplying saturated water vapor under pressure comprising a water vapor liquid ring compressor using water as means of compression, having a vapor inlet connected to a source of pure water vapor at low pressure and a water inlet connected to a source of water for compression; a first separator comprising a chamber having a vapor top portion which is connected to a discharge vapor outlet of the compressor and to the inlet of a user for compressed saturated water vapor, and a water bottom portion connected to the water inlet of said compressor downstream of said source of compression water for recycling water thereto, and means for controlling the flow of new water to said compressor in response to the level of water in said first separator so that the level of water in said first separator will be kept approximately constant, said source of pure water vapor at low pressure including an condenser/evaporator, the condenser portion of which communicates with a source of water vapor and/or of wet air and evaporator portion of which communicates with the vapor top portion of a second separator, the vapor portion of said second separator having on the top an outlet connected to said vapor inlet of said compressor, the water bottom portion of the second separator communicating on the one hand with the inlet of the evaporator and on the other hand with a source of compression water, said second separator having means for controlling the feed of compression water to said condenser/evaporator in response to the level of water in said second separator, so that the level of water in said second separator will be kept approximately constant.

2. A thermal circuit for supplying water vapor under pressure comprising a water vapor liquid ring compressor using water as means of compression, having a vapor inlet connected to a source of pure water vapor at low pressure and a water inlet connected to a source of water for compression; a first separator comprising a chamber having a vapor top portion which is connected to a discharge vapor outlet of the compressor and to the inlet of a condenser for the use of compressed saturated water vapor, and a water bottom portion connected to the water inlet of said compressor downstream of said course of compression water for recycling water thereto, and means for controlling the flow of new water to said compressor in response to the level of water in said first separator so that the level of water in said first separator will be kept approximately constant, said source of pure water vapor at low pressure including a condenser/evaporator, the condenser portion of which communicates with a source of water vapor and/or of wet air and the evaporator portion of which communicates with the vapor top portion of said second separator, said second separator having on the top an outlet connected to said vapor inlet of said compressor, the water bottom portion of the second separator communicating on the one hand with the inlet of the evaporator and on the other hand with a source of compression water, said second separator having means for controlling the feed of compression water to said condenser/evaporator in response to the level of water in said second separator, so that the level of water in said second separator will be kept approximately constant.

3. A thermal circuit for supplying saturated water vapor under pressure comprising a water vapor liquid ring compressor using water as means of compression, having a vapor inlet connected to a source of pure water vapor at low pressure and a water inlet connected to a source of water for compression; a first separator comprising a chamber having a vapor top portion which is connected to a discharge vapor outlet of the compressor and to the inlet of a condenser for the use of compressed saturated water vapor, and a bottom water portion connected to the water inlet of said compressor downstream of said source of compression water for recycling water thereto, and means for controlling the flow of new water to said compressor in response to the level of water in said first separator so that the level of water in said first separator will be kept approximately constant, including a further separator having a vapor top portion and a water bottom portion, the vapor portion of said further separator being connected to the outlet of said user condenser for receipt of vapor and the water portion being connected to the water portion of said first separator for recycling of said water thereto, and means responsive to the level of water in said further separator to control the flow of water to said first separator.

4. The thermal circuit according to claim 3, in which the source of pure water vapor at low pressure includes a condenser evaporator, the condenser of which communicates with a source of water vapor and/or of wet air, and the outlet from the evaporator communicates with the vapor portion of a second separator, the water portion of the second separator communicating on the one hand with the inlet of the evaporator and on the other hand with a source of compression water, said second separator having means for controlling the feed of new water to said condenser/evaporator in response to the level of water in said second separator, so that the level of water in said second separator will be kept approximately constant.

5. A thermal circuit for supplying a saturated pure water vapor under pressure comprising a series of water vapor liquid ring compressors using water as means of compression and associated water-water vapor separator, each compressor having a vapor inlet connected to a source of pure water vapor and a water inlet connected to a source of compression water, each separator comprising a chamber having a vapor top portion and a water bottom portion, the vapor top portion of each separator having an inlet connected to the discharge vapor outlet of the associated compressor and having a vapor outlet, all but the last of the vapor outlets being connected to the vapor inlet of the next succeeding compressor, the outlet of the vapor top portion of the last of said separators being connected to the inlet of a user for compressed saturated water vapor, the water bottom portion of each separator being connected to the water inlet of the associated compressor downstream of said source of compression water for recycling water to the associated compressor, and having means for controlling the flow of compression water to said associated compressor in response to the level of water therein so that the level of water therein will be kept approximately constant.

6. The thermal circuit according to claim 5, in which the said user for the compressed, saturated water vapor comprises at least one condenser.

7. The thermal circuit according to claim 5, wherein the water portion of said separator chamber is connected to said compressor with the intermediary of a pump.

8. The thermal circuit according to claim 7, including means for sensing the level of water in each said separator and valve means responsive thereto interposed between said source of compression water and the associated compressor.

9. The thermal circuit according to claim 6, including a further separator having a vapor top portion and a water bottom portion, the vapor portion of said further separator being connected to the outlet of said user condenser for receipt of vapor and the water portion being connected to the water portion of the last in the series of separators for recycling of said water thereto, and means responsive to the level of water in said further separator to control the flow of water to said last in the series separator.

10. The thermal circuit according to claim 9, in which the source of pure water vapor at low pressure includes a condenser/evaporator, the condenser of which communicates with a source of water vapor and/or of wet air, and the outlet from the evaporator communicates with the vapor portion of an associated separator, said vapor portion of said associated separator having an outlet communicating with the vapor inlet of the first in the series of compressors, the water portion of the associated separator communicating on the one hand with the inlet of the evaporator and on the other hand with a source of compression water, the separator having means for controlling the feed of compression water to said condenser/evaporator in response to the level of water in said associated separator, so that the level of water in said associated separator will be kept approximately constant.

* * * * *

UNITED STATES PATENT AND TRADEMARK OFFICE
CERTIFICATE OF CORRECTION

PATENT NO. : 4,260,335
DATED : Apr. 7, 1981
INVENTOR(S) : Paul H. MARCHAL and Pierre M. VIALLIER It is certified that error appears in the above-identified patent and that said Letters Patent are hereby corrected as shown below:

On the cover sheet [75] the names of the inventors should read -- PAUL H. MARCHAL, Garches, France ; PIERRE M. VIALLIER, Viller/Thur, France --

Signed and Sealed this

Eighteenth Day of August 1981

[SEAL]

*Attest:*

*Attesting Officer*

GERALD J. MOSSINGHOFF

*Commissioner of Patents and Trademarks*